(12) United States Patent
Curtis

(10) Patent No.: US 6,343,937 B1
(45) Date of Patent: Feb. 5, 2002

(54) BLOCK

(76) Inventor: Mark Curtis, 88 Battersea High Street, London SW1 3HP (GB)

(*) Notice: Subject to any disclaimer, the term of this patent is extended or adjusted under 35 U.S.C. 154(b) by 0 days.

(21) Appl. No.: 09/554,981

(22) PCT Filed: Jul. 27, 1998

(86) PCT No.: PCT/GB98/02225

§ 371 Date: May 12, 2000

§ 102(e) Date: May 12, 2000

(87) PCT Pub. No.: WO99/05662

PCT Pub. Date: Feb. 4, 1999

(30) Foreign Application Priority Data

Jul. 28, 1997 (GB) .............................................. 9715891

(51) Int. Cl.⁷ .............................................. G09B 23/26
(52) U.S. Cl. ...................................... 434/279; 434/276
(58) Field of Search ................................. 434/276, 278, 434/279, 85, 112, 113, 114, 119, 125

(56) References Cited

U.S. PATENT DOCUMENTS

| 3,802,097 A | 4/1974 | Gluck |
| 3,854,223 A | 12/1974 | Dingman, II |
| 3,903,616 A | 9/1975 | Gage |
| 4,184,271 A | 1/1980 | Barnett, Jr. |

FOREIGN PATENT DOCUMENTS

| GB | 1 277 731 | 6/1972 |
| GB | 2 108 857 A | 5/1983 |

*Primary Examiner*—Sam Rimell
(74) *Attorney, Agent, or Firm*—Sughrue Mion, PLLC

(57) ABSTRACT

A block includes a hole provided on one side of the block, two fifths of the length of the block from one end, and a pin provided on the opposite side of the block two fifths of the length of the block from the other end. The hole is arranged to be connected to the pin of a like underlying or overlying block, so that a plurality of said blocks can be connected to form a double helix. Each end of the block includes a knob for connecting a plurality of blocks to a flexible member which follows a double helix shape to produce a model for DNA.

9 Claims, 4 Drawing Sheets

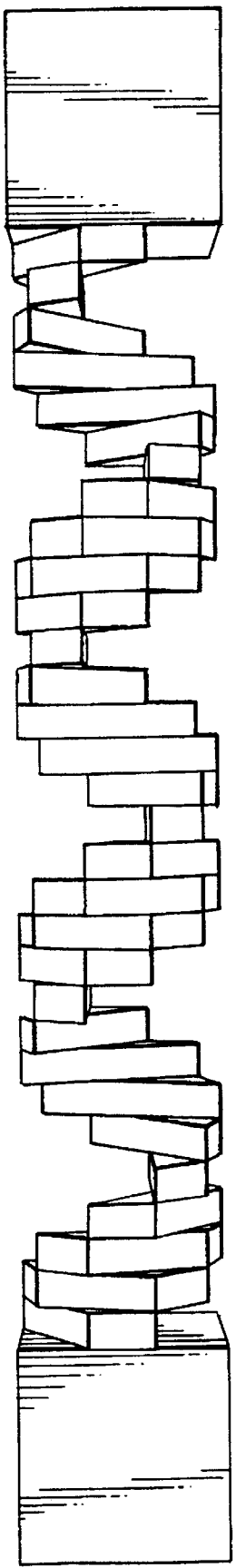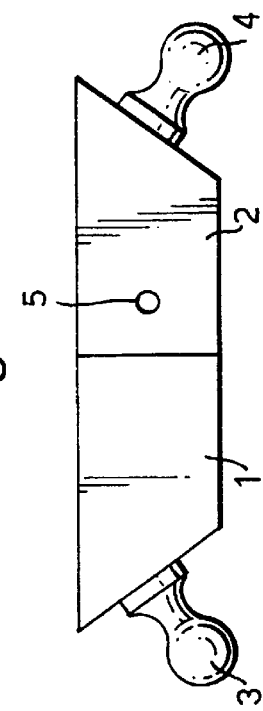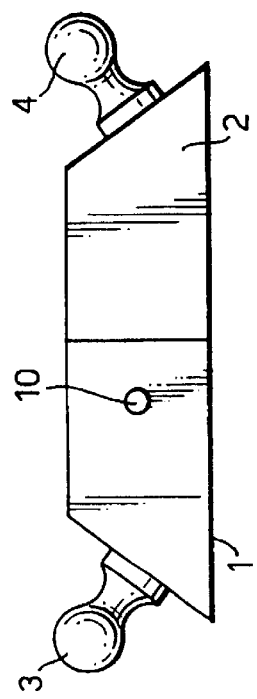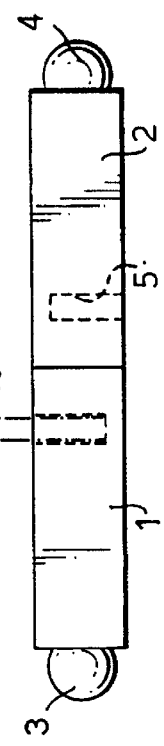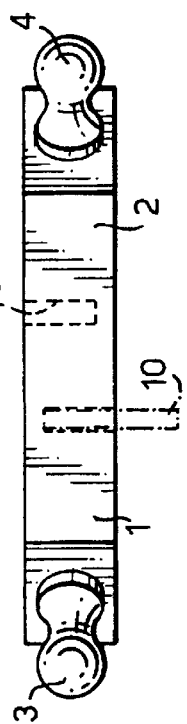
Fig.3.
Fig.4.
Fig.5.
Fig.6.
Fig.7.

BLOCK

BACKGROUND TO THE INVENTION

The present invention relates to a building block for making a model, and in particular to a building block arranged to be connected to other similar building blocks to produce a double helix.

DISCLOSURE OF THE INVENTION

A double helix is a known geometrical shape, and is the natural shape for DNA.

According to the present invention, a block includes a first pivotal connection means provided on one side of the block, two fifths of the length of the block from one end, and a second pivotal connection-means provided on the opposite side of the block two fifths of the length of the block from the other end, the first pivotal connection means being arranged to be connected to the second pivotal connection means of a like underlying or overlying block, so that a plurality of said blocks can be connected to form a double helix.

With the blocks according to the present invention, a model of a double helix can be produced which can easily be assembled and disassembled for use as a toy or puzzle, and can be used as a model for DNA for use as a teaching aid.

It is preferred that each end of the block includes a linking means for connecting a plurality of blocks to a flexible member which follows the double helix shape. The linking means ensures that the blocks making up the double helix shape are correctly spaced when connected to the flexible member to give the desired arrangement, and also hold the blocks together. Preferably the linking means comprises a projection projecting from the end of the block. In this case, the linking means preferably includes an enlarged end portion for holding a flexible member to the block. The linking means is preferably rounded so that the linking means may easily be inserted into a hole or space provided on the flexible member to allow an easy snap fit of the blocks to the flexible member, but which will not become separated easily, and therefore will hold the model together.

The flexible member is preferably formed from a pair of twisted ropes, and in this case the linking means can be received in the gaps between adjacent twists of the rope. In this case, the crossover points of the rope are preferably secured, for example by stitching or with pins. This ensures accurate positioning of the blocks, and ensures that the rope does not become untwisted if the blocks become separated from the rope. Alternatively the flexible member may be in the form of a webbing which includes holes for receiving the linking means.

In an alternative example of the present invention, the linking means may be in the form of recesses provided on the ends of the blocks, and in this case the flexible member carries projections which are received by the recesses on the end of the blocks to connect the blocks to the flexible member.

Each of the blocks preferably have a general trapezoidal shape, with the opposed ends of the block being at an acute angle with respect to each other. The angle between the two opposed ends of the block is approximately 72°, with the angle between each opposed end and the long side being approximately 54°. Where linking means are provided on the ends of the blocks, these are preferably provided generally normal to the ends of the blocks.

The block is preferably formed in two separable parts which are connectable together by a joining means. This is especially beneficial where the blocks are to represent base pairs of DNA, since each of the parts of the block represent one of the bases of DNA. The separable blocks also allow the complete disassembly and reassembly of the model. Preferably each part of the block is formed of a different colour. The blocks may be manufactured from a variety of materials including wood, metal and plastics.

Where the block is formed of two component parts, the joining means is preferably in the form of a pin on one of the parts which is receivable in a corresponding hole on the other part. This allows for simple connection and disconnection of the body parts. In this case, it is preferred that more than one pin and corresponding hole are provided for connecting two blocks. In this way, rotational movement of the parts with respect to each other is prevented. In this case, each of the parts of the block may include a pin and a hole, or one of the parts may include a plurality of pins, and the other a plurality of corresponding holes.

A clip is advantageously provided to secure the two parts of the block, and prevent them from falling apart.

Where the block is formed of two parts, there are preferably two sorts of block, in which the overall shape of the block is the same, but in which a part from one block cannot be joined to a part from a different block. This may be achieved by a different arrangement of joining means on the components of each type of block. This is advantageous both where the blocks are used as a toy or puzzle as it increases the complexity of assembling the model, and is beneficial where the blocks are used to represent the base pairs of DNA as this ensures that representations only of allowable base pairs can be made.

Advantageously, the first or second pivotal connection means may be a cylindrical spigot, and the other of the pivotal connection means may be a hole having a diameter slightly larger than the spigot and which receives the spigot. Where the blocks are made from two parts which are joined together, the first and/or second pivotal connection means may be produced in two parts, each of the parts of the pivotal connection means being provided on one part of the block, although it is preferred that the joint is offset from the pivotal connection means. This makes the manufacture of the blocks more simple, and gives greater structural rigidity. Advantageously the block is formed in two halves. Only one shaped piece need then be made. This single piece may be made with one hole on the top side and two holes on the edge which joins to the other half of a block. The single piece may then be adapted by insertion of a spigot into the top hole and a spigot into one of the edge holes into a piece suitable to joining to a second piece with a spigot in the other edge hole to form a single block.

Preferably, the blocks can be arranged to form a double helix in which ten blocks are required to form a complete turn.

BRIEF DESCRIPTION OF THE DRAWINGS

A description of an example of the present invention will be described with respect to the accompanying drawings, in which

FIG. 3 shows a double helix having a complete turn for every ten blocks;

FIG. 4 shows a plan view of a block according to a second embodiment of the invention;

FIG. 5 shows a front view of a block according to the second embodiment of the invention;

FIG. 6 shows an underside plan view of a block according to the second embodiment of the invention;

FIG. 7 shows a back view of a block according to the second embodiment of the invention;

DETAILED DESCRIPTION OF THE PREFERRED EMBODIMENTS

Figure 1:
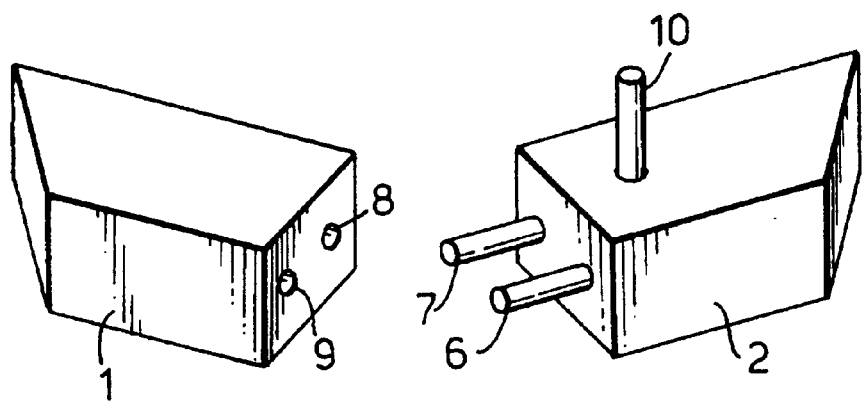
FIG. 1 shows two parts of a block according to a first embodiment of the invention.

FIG. 1 shows two component 1,2 parts of a block according to the present invention. The first component 1 of the block includes a main body portion 1, and two holes 8,9 extending laterally into the body 1. The second component 2 includes two pins 6,7 extending laterally out of the body 2, together with an upstanding pin 10.

Figure 2:
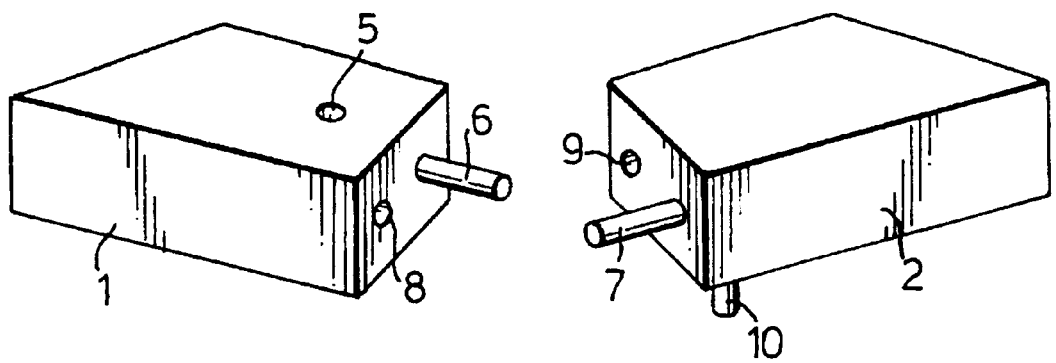
FIG. 2 shows two parts of a block according to the first embodiment of the invention having an alternative pairing mechanism.

The two components 1,2 are able to fit together to produce the complete block. The pins 6,7 on the second component 2 are received in the holes 8,9 of the first component 1. When the blocks are connected together in this way, the upstanding pin 10 is receivable in the circular hole 5 on the underside of a first portion of a like overlying block allowing a number of blocks to be connected together. FIG. 2 shows the underside of the block, showing the hole 5 for receiving the upstanding pin 10 of an underlying block.

Different arrangements of holes 8,9 and pins 6,7 are possible, for example as shown in FIG. 2, each of the components may include one pin and one hole. The pin 6 on the first component 1 is received in the hole 9 of the second component 2 and the pin 7 on the second component 2 is received in the hole 8 in the first component 1. This arrangement has the advantage that it is not possible to connect the two parts of the block in a reversed orientation to form a parallelogram rather than a trapezoid shape. Alternatively more pins and more holes may be provided on the components. This allows a number of different components to be provided, but with particular components only able to connect with particular ones of the other components. When the model is to represent DNA, four different components may be provided, one representing each of Adenine, Thymine, Guanine and cytosine, with the components representing Adenine and Thymine being connectable together, and the components representing Guanine and Cytosine being connectable together, but not being connectable to other components. The two components connected together represent the base pairs of DNA. Each of the components are of a different colour to allow for their easy identification.

By connecting a number of blocks together by inserting the pin 10 of one block into the hole 5 in an overlying block, a model can be formed. The overlying blocks are pivotal with respect to each other due to the circular pin 10 and circular hole 5. Due to the positioning of the holes 5 and pins 10 at two fifths from the ends of the blocks, the blocks can be pivoted to a position in which the ends of the blocks form a double helix in which there is a. complete turn for every ten blocks. This arrangement is shown in FIG. 3. DNA naturally has the shape of a double helix with a complete turn for every ten base pairs.

Figure 8:
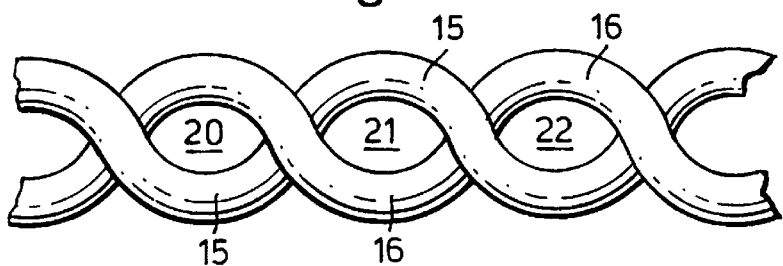
FIG. 8 shows a flexible member for connecting blocks according to the second embodiment of the present invention.
Figure 9:
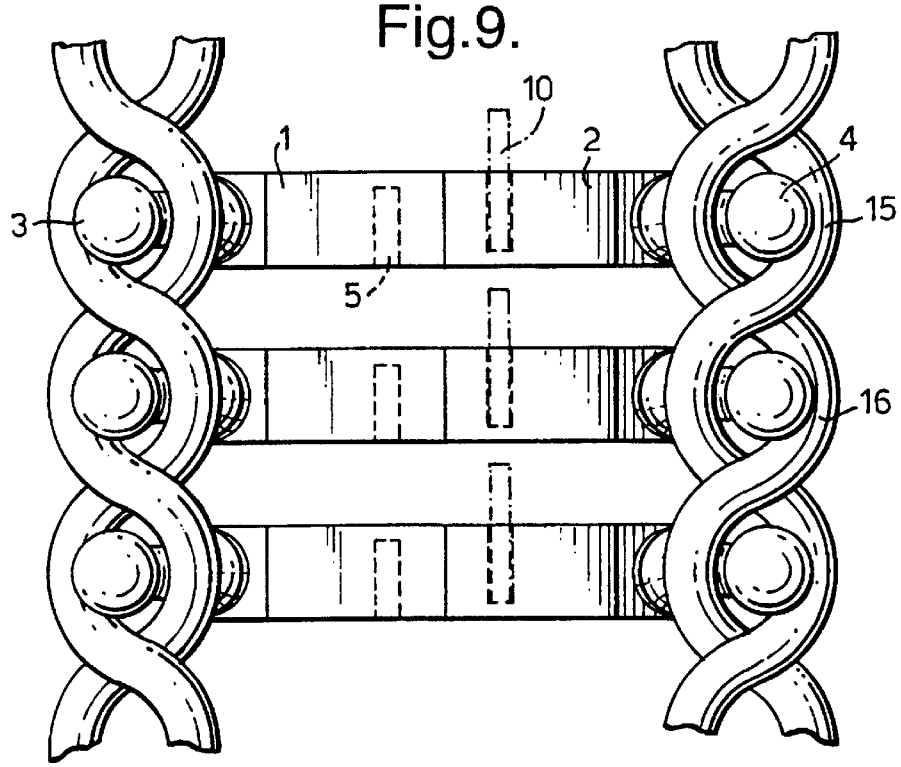
FIG. 9 shows the flexible member of FIG. 8 connected to blocks according to the second embodiment of the present invention.
Figure 10:
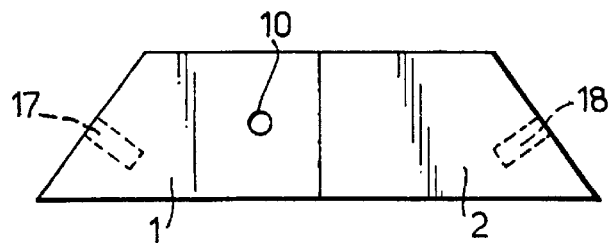
FIG. 10 shows a plan view of a block according to a third embodiment of the invention.
Figure 11:
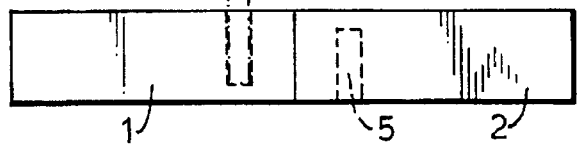
FIG. 11 shows a front view of a block according to the third embodiment of the invention.
Figure 12:
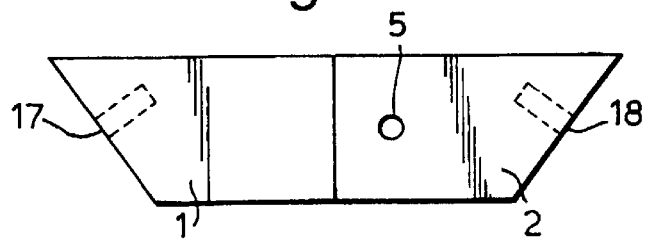
FIG. 12 shows an underside plan view of a block according to the third embodiment of the invention.
Figure 13:
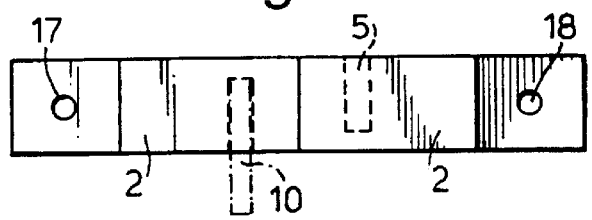
FIG. 13 shows a back view of a block according to the third embodiment of the invention.

FIGS. 4 to 7 illustrate a block according to a second embodiment of the invention. Each component 1,2 includes a knob 3,4 provided on one end of the body portion 1,2. The knobs 3,4 on the ends of the components 1,2 of the blocks are connected to a flexible member to hold the double helix in place. FIG. 8 illustrates a preferred embodiment of a suitable flexible member. The flexible member is in the form of a rope which is folded in two, and is twisted. The two parts 15,16 of the double rope are twisted to define a number of spaces 20,21,22. The knobs 3,4 of the components 1,2 of the block are received in these spaces 20,21,22 as shown in FIG. 9. As the ends of the block form a double helix, two such twists of rope are required to receive all of the knobs 3,4. The ropes themselves each form a helix, so that the two ropes together define a double helix.

The flexible member may alternatively be in the form of a webbing including holes which receive the knobs 3,4 of the blocks.

Figure 14:
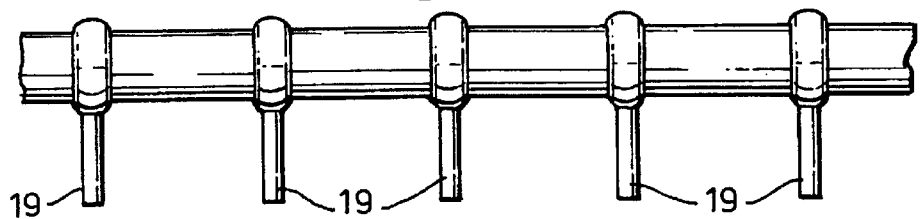
FIG. 14 shows a flexible member for connecting blocks according to the third embodiment of the present invention.
Figure 15:
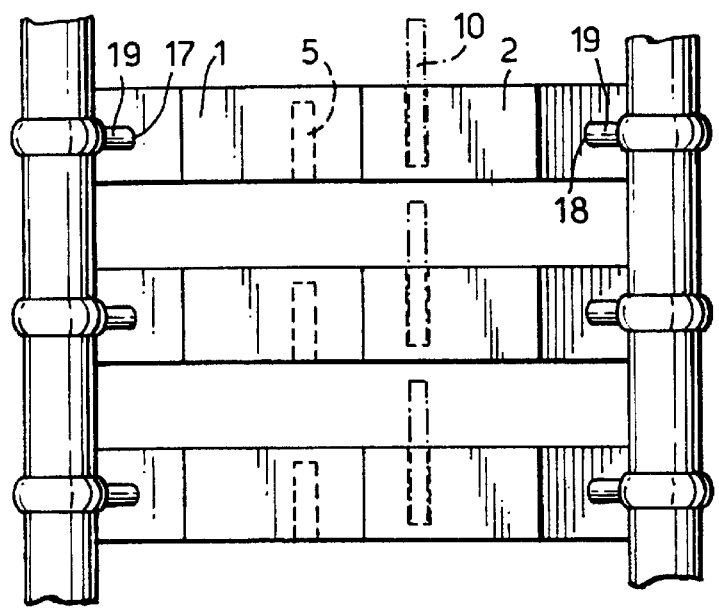
FIG. 15 shows the flexible member of FIG. 15 connected to blocks according to the third embodiment of the present invention.

FIGS. 10 to 13 show a block according to a third embodiment of the invention. Recesses 17,18 are provided at the ends of the blocks in place of the knobs 3,4 shown in FIGS. 4 to 7. The flexible member for connecting the blocks is shown in FIG. 14 and includes projections 19 which are received into the recesses 17,18 as shown in FIG. 15.

When the blocks are designed to represent the base pairs of DNA, the flexible member represents the phosphate chain, and the knobs 3,4 or the projections 19 represent the sugars on the components of the base pair.

What is claimed is:

1. A block having a first pivotal connection means provided on one side of the block, two fifths of the length of the block from one end, and a second pivotal connection means provided on the opposite side of the block two fifths of the length of the block from the other end, the first pivotal connection means being arranged to be connected to the second pivotal connection means of a like underlying or overlying block, so that a plurality of said blocks can be connected to form a double helix, wherein each end of the block includes a linking means for connecting a plurality of blocks to a flexible member which follows the double helix shape, and wherein the linking means comprises a projection projecting from the end of the block, wherein the projection is received in a recess in the flexible member.

2. A block as claimed in claim 1 formed in two separable parts which are connectable together by a joining means.

3. A block as claimed in claim 2 wherein the block is formed in two halves.

4. A block as claimed in claim 1 wherein one of the first or second pivotal connection means comprises a cylindrical spigot, and the other of the pivotal connection means comprises a hole having a diameter slightly larger than the spigot and which receives the spigot of an adjacent block.

5. A model comprising a plurality of blocks as claimed in claim 1, wherein the flexible member comprises a pair of twisted ropes, wherein the crossover points of the ropes are secured and wherein the projections are received in the gaps between adjacent twists of the ropes.

6. A block having a first pivotal connection means provided on one side of the block, two fifths of the length of the block from one end, and a second pivotal connection means provided on the opposite side of the block two fifths of the length of the block from the other end, the first pivotal connection means being arranged to be connected to the second pivotal connection means of a like underlying or overlying block, so that a plurality of said blocks can be connected to form a double helix, wherein said block has a general trapezoidal shape, with the opposed ends of the block being at an acute angle with respect to each other.

7. A block as claimed in claim 6 wherein the angle between the two opposed ends of the block is approximately 72°, with the angle between each opposed end and the long side being approximately 54°.

8. A block having a first pivotal connection means provided on one side of the block, two fifths of the length of the block from one end, and a second pivotal connection means provided on the opposite side of the block two fifths of the length of the block from the other end, the first pivotal connection means being arranged to be connected to the second pivotal connection means of a like underlying or overlying block, so that a plurality of said blocks can be connected to form a double helix, wherein said block is formed in two separable parts which are connectable together by a joining means, and wherein the joining means comprises more than one pin on one part of the block and corresponding hole on the other part.

9. A block as claimed in claim 8 wherein each of the parts of the block includes a pin and a hole.

\* \* \* \* \*